US011260827B1

(12) United States Patent
Lin (10) Patent No.: US 11,260,827 B1
(45) Date of Patent: Mar. 1, 2022

(54) METHOD FOR ACHIEVING INTERACTIONS BETWEEN USER AND AUTOMOBILE

(71) Applicant: TUNG THIH ELECTRONIC CO., LTD., Taoyuan (TW)

(72) Inventor: Chi-Sheng Lin, Taoyuan (TW)

(73) Assignee: TUNG THIH ELECTRONIC CO., LTD., Taoyuan (TW)

( * ) Notice: Subject to any disclaimer, the term of this patent is extended or adjusted under 35 U.S.C. 154(b) by 0 days.

(21) Appl. No.: 17/337,269

(22) Filed: Jun. 2, 2021

(30) Foreign Application Priority Data

Mar. 17, 2021 (TW) .................. 110109506

(51) Int. Cl.
*B60R 25/24* (2013.01)
*B60R 25/01* (2013.01)
*G07C 9/00* (2020.01)
*H04B 17/318* (2015.01)

(52) U.S. Cl.
CPC ............ *B60R 25/245* (2013.01); *B60R 25/01* (2013.01); *G07C 9/00309* (2013.01); *H04B 17/318* (2015.01); *G07C 2009/00769* (2013.01); *G07C 2009/00984* (2013.01); *G07C 2209/63* (2013.01)

(58) Field of Classification Search
None
See application file for complete search history.

(56) References Cited

U.S. PATENT DOCUMENTS

| 6,073,102 | A | * | 6/2000 | Block | G10L 15/26 704/275 |
| 2005/0270138 | A1 | * | 12/2005 | Ikeda | B60R 25/24 340/5.23 |
| 2006/0091997 | A1 | * | 5/2006 | Conner | B60R 25/1003 340/5.64 |
| 2020/0408869 | A1 | * | 12/2020 | Oman | G01S 5/0284 |

* cited by examiner

*Primary Examiner* — Carlos Garcia (57) ABSTRACT

A method for achieving interactions between user and automobile is disclosed. Specifically, the automobile is equipped with multiple distance sensors and multiple multi-dimensional sensors, and has a processor that is constituted to a keyless entry system with an electronic car key. During conducting the method, the distance sensors detect an approaching object, and the multi-dimensional sensors collect multi-dimensional parameters of the approaching object, such that the processor is able to judge an object action of the approaching object based on the multi-dimensional parameters. As a result, in case of the object action is determined to correspond with one of reference object actions, the automobile is controlled by the processor so as to conduct a specific action, for example, unlocking a door lock, opening a car door, adjusting an illumination of at least one car headlight, and starting automobile engine.

13 Claims, 7 Drawing Sheets

S1: utilizing the processor 210 to arrange a first database 211 and a second database 213 in the memory of the central console 21, and then to store a plurality of reference object actions in the first database 211, and to store a plurality of automobile actions that are respectively corresponding to the plurality of reference object actions in the second database 213

S2: controlling the plurality of distance sensors 22, by the processor 210, to detect at least one object 4

S3: in case of the plurality of distance sensors 22 detecting that there is at least one object 4 approaching the automobile 2 gradually, utilizing the processor 210 to control the plurality of distance sensors 22 to detect a distance between the object 4 and the automobile 2, to control the plurality of first multi-dimensional sensors 23 to collect a first multi-dimensional data from the object 4, and to control the plurality of second multi-dimensional sensors 24 to collect a second multi-dimensional data from the object 4

S4: determining an object action of the object 4 by the processor 210 according to a distance data received from the plurality of distance sensors 22, the first multi-dimensional data received from the plurality of first multi-dimensional sensors 23, and the second multi-dimensional data received from the plurality of second multi-dimensional sensors 24

S5: controlling the automobile 2 to conduct a specific automobile action by the processor 210, wherein the specific automobile action is chosen by the processor 210 from the plurality of automobile actions stored in the second database 213

FIG.6 controlling light beams of the car headlights to shift right, thereby strengthening the illumination on the right front position of the automobile

METHOD FOR ACHIEVING INTERACTIONS BETWEEN USER AND AUTOMOBILE

BACKGROUND OF THE INVENTION

1. Field of the Invention

The present invention relates to the technology field of automotive electronics, and more particularly to a method for achieving interactions between user and automobile.

2. Description of the Prior Art

With continuous innovation and development of wireless communication technologies, keyless entry system (KES) is widely applied in controlling door locks of an automobile. The keyless entry system comprises a main controller that is installed in a central control system of the automobile and an electronic car key. When a user carrying with the electronic car key walks and gradually gets closer to a car door of his car, the main controller automatically applies an keyless entry (KE) authorization check to the electronic car key, thereby unlocking the car door's lock in case of the electronic car key passing the KE authorization check.

From above descriptions, it is understood that the conventional keyless entry system exhibits a major drawback in practical use, that is, in case of a corresponding electronic car key is taken by a user so as to be closer to a car door of an automobile, the main controller would unlock the car door's lock immediately even though the user is also staying closer to the car door.

Accordingly, China patent publication No. CN110462156A has constituted at least one ultrasonic sensor and the conventional keyless entry system to an improved keyless entry system. The improved keyless entry system comprises: a main controller installed in a central control system of an automobile, and an electronic car key and at least one ultrasonic sensor that is disposed below a car door of the automobile. When a user carrying with the electronic car key walks and gradually gets closer to the car door, the main controller automatically applies a KE authorization check to the electronic car key. Subsequently, after the user puts out a foot to let the ultrasonic sensor detect an object (i.e., the foot), the main controller unlocks the car door's lock in case of the ultrasonic sensor not detecting the foot (i.e., object) again after a period of time passes.

According to the disclosures of China patent publication No. CN110462156A, the user still needs to trigger an object detection of the ultrasonic sensor by his one foot after taking the electronic car key to trigger the main controller completing the KE authorization check, such that the car door's lock can be unlocked by the main controller. However, for the elderly persons and the persons with limited mobility or disabilities, they may fall over during putting out one foot for triggering the object detection of the ultrasonic sensor.

From above descriptions, it is understood that there are still rooms for improvement in the conventional keyless entry system (KES) and the improved keyless entry system disclosed by China patent publication No. CN110462156A. In view of that, inventors of the present application have made great efforts to make inventive research and eventually provided a method for achieving interactions between user and automobile.

SUMMARY OF THE INVENTION

The primary objective of the present invention is to disclose a method for achieving interactions between user and automobile. The method is carried out by a processor that is installed in a central console of an automobile. Specifically, the automobile is equipped with a plurality of distance sensors and a plurality of multi-dimensional sensors, and the processor and an electronic car key are constituted to a keyless entry system (KES). During the execution of the method, the distance sensors are controlled to detect an approaching object, and the multi-dimensional sensors are controlled to collect multi-dimensional parameters of the approaching object, such that the processor is able to judge an object action of the approaching object based on the multi-dimensional parameters. As a result, in case of the object action is determined to correspond with one of reference object actions that are stored in a database of the processor, the automobile is controlled by the processor so as to conduct a specific action, for example, unlocking a door lock, opening a car door, adjusting an illumination of at least one car headlight, and starting automobile engine.

In order to achieve the primary objective of the present invention, inventors of the present invention provides an embodiment of the method for achieving interactions between user and automobile, which is conducted by a processor that is installed in a central console of an automobile. In which, the central console has a memory, the automobile is equipped with a plurality of distance sensors, a plurality of first multi-dimensional sensors, and a plurality of second multi-dimensional sensors, and the automobile has a keyless entry system comprising the processor and an electronic car key. The method comprises the steps of:

(1) utilizing the processor to arrange a first database and a second database in the memory of the central console, and then to store a plurality of reference object actions in the first database, and to store a plurality of automobile actions that are respectively corresponding to the plurality of reference object actions in the second database;

(2) controlling the plurality of distance sensors, by the processor, to detect at least one object;

(3) in case of the plurality of distance sensors detecting that there is at least one object approaching the automobile gradually, utilizing the processor to control the plurality of distance sensors to detect a distance between the object and the automobile, to control the plurality of first multi-dimensional sensors to collect a first multi-dimensional data from the object, and to control the plurality of second multi-dimensional sensors to collect a second multi-dimensional data from the object;

(4) determining an object action of the object by the processor according to a distance data received from the plurality of distance sensors, the first multi-dimensional data received from the plurality of first multi-dimensional sensors, and the second multi-dimensional data received from the plurality of second multi-dimensional sensors; and (5) controlling the automobile to conduct a specific automobile action by the processor, wherein the specific automobile action is chosen by the processor from the plurality of automobile actions stored in the second database.

In one embodiment, the central console has a user interface, and the user interface allows a user to optionally enable a function of the object action detection of the automobile, and/or to optionally enable a keyless entry function conducted by using the electronic car key to pass a keyless entry authorization check executed by the processor so as to lock or unlock a door lock of the automobile.

In one embodiment, the processor comprises a program including instructions for acquiring an immediate weather information, such that the processor produces at least one weight parameter based on the immediate weather information, so as to utilize the at least one weight parameter to adjust the distance data, the first multi-dimensional data and/or the second multi-dimensional data.

In a practicable embodiment, the plurality of automobile actions comprise unlocking a door lock, opening a car door, adjusting an illumination of at least one car headlight, starting automobile engine, starting air conditioner, controlling an in-vehicle camera, and honking a car horn.

In one embodiment, in case of the keyless entry function being enabled by operating the user interface, the method further comprises an additional step connected between the step (4) and the step (5) of:

(4a) the processor communicating with the electronic car key that is near to the automobile through a wireless interface, thereby conducting a keyless entry authorization check to the electronic car key.

In one embodiment, in case of the object action being determined to fail to correspond with any one of the plurality of reference object actions as well as the processor not communicating with the electronic car key, an in-vehicle camera of the automobile being controlled by the processor to start a video recording work.

In a practicable embodiment, the distance sensor is selected from a group consisting of infrared (IR) radar, near-IR radar, ultrasonic radar, microwave radar and millimeter-wave radar.

In one practicable embodiment, the first multi-dimensional sensor is a microwave radar or a millimeter-wave radar, and the second multi-dimensional sensor is a light detection and ranging (LiDAR) sensor.

In another one practicable embodiment, the second multi-dimensional sensor is selected from a group consisting of light detection and ranging (LiDAR) sensor and in-vehicle camera.

In a practicable embodiment, the first multi-dimensional data includes at least one parameter selected from a group consisting of object velocity, object direction angle, and object distance, and the second multi-dimensional data includes at least one parameter selected from a group consisting of object shape, the object distance, object azimuth angle, object elevation angle, and object velocity.

BRIEF DESCRIPTION OF THE DRAWINGS

The invention as well as a preferred mode of use and advantages thereof will be best understood by referring to the following detailed description of an illustrative embodiment in conjunction with the accompanying drawings, wherein:

FIG. 6 shows a flowchart diagram of a method for achieving interactions between a user and an automobile according to the present invention.

DETAILED DESCRIPTION OF THE PREFERRED EMBODIMENTS

To more clearly describe a method for achieving interactions between user and automobile according to the present invention, embodiments of the present invention will be described in detail with reference to the attached drawings hereinafter.

Figure 1:
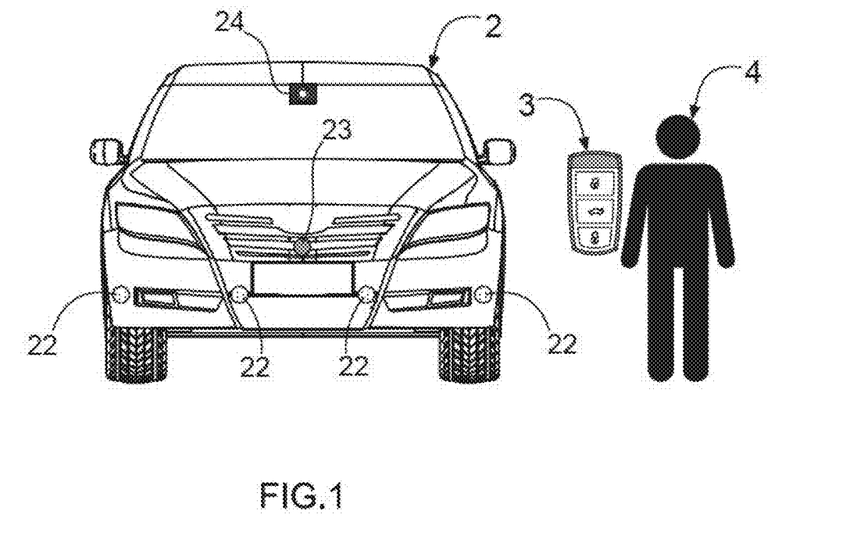
FIG. 1 shows a front-view diagram of an automobile.
Figure 2:
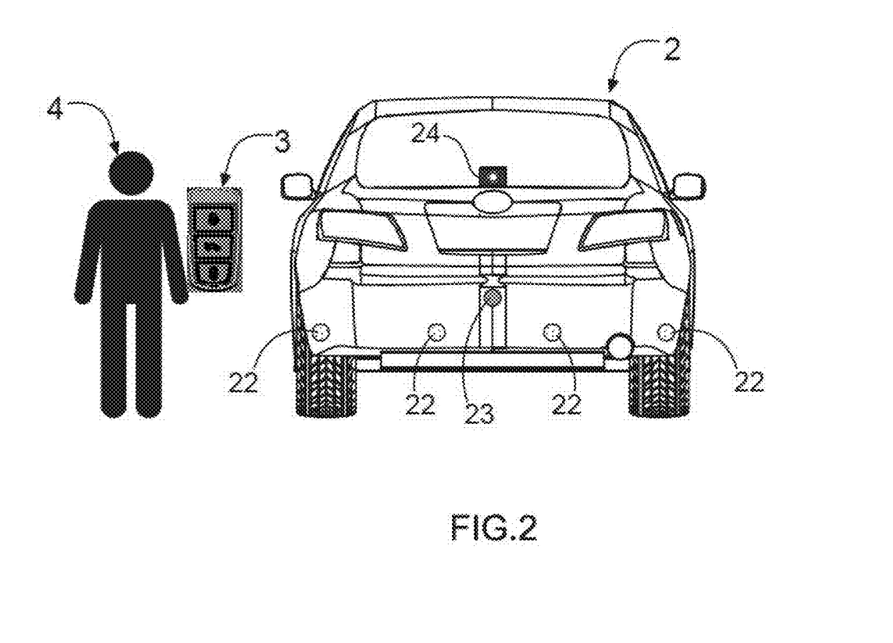
FIG. 2 shows a rear-view diagram of the automobile.
Figure 3:
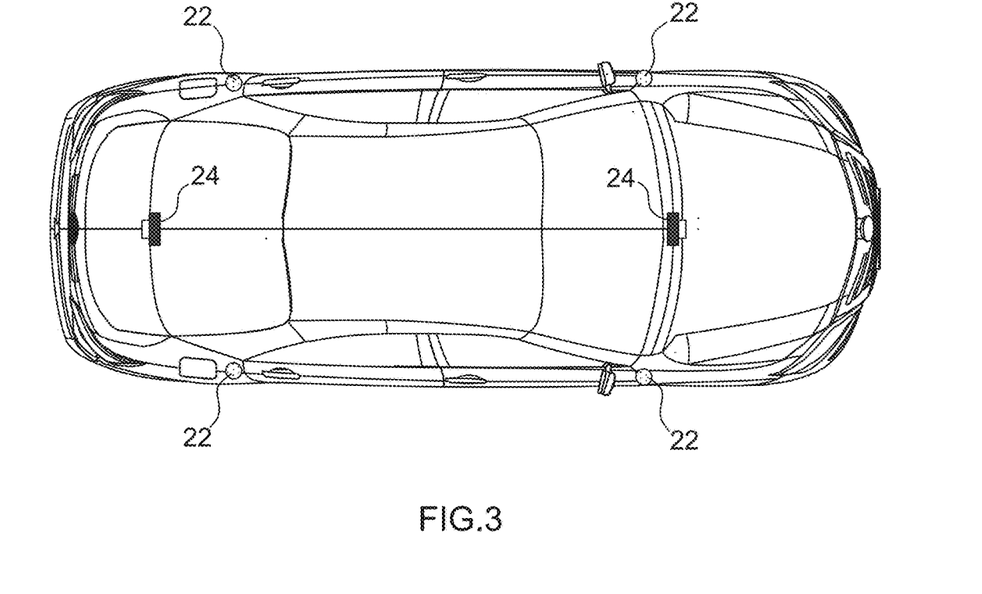
FIG. 3 shows a top-view diagram of the automobile.
Figure 4:
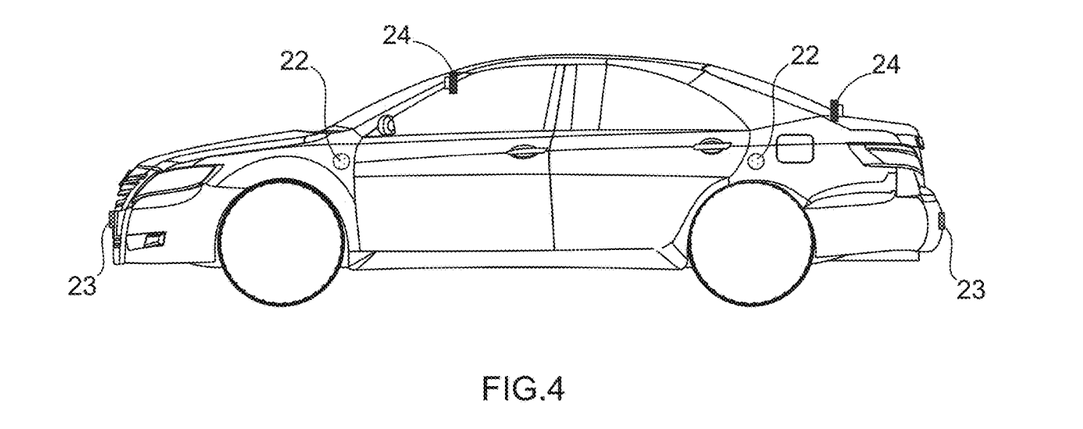
FIG. 4 shows a first side-view diagram of the automobile.

With reference to FIG. 1, FIG. 2, FIG. 3, and FIG. 4, there are shown a front-view diagram, a rear-view diagram, a top-view diagram, and a first side-view diagram of an automobile. According to the present invention, a method for achieving interactions between a user and an automobile is disclosed, and the method is conducted by a central console of the 2. As FIGS. 2-4 show, the automobile 2 is equipped with a plurality of distance sensors 22, a plurality of first multi-dimensional sensors 23, and a plurality of second multi-dimensional sensors 24. Moreover, the automobile 2 has a keyless entry system comprising a processor 210 of the central console 21 and an electronic car key 3.

Figure 5:
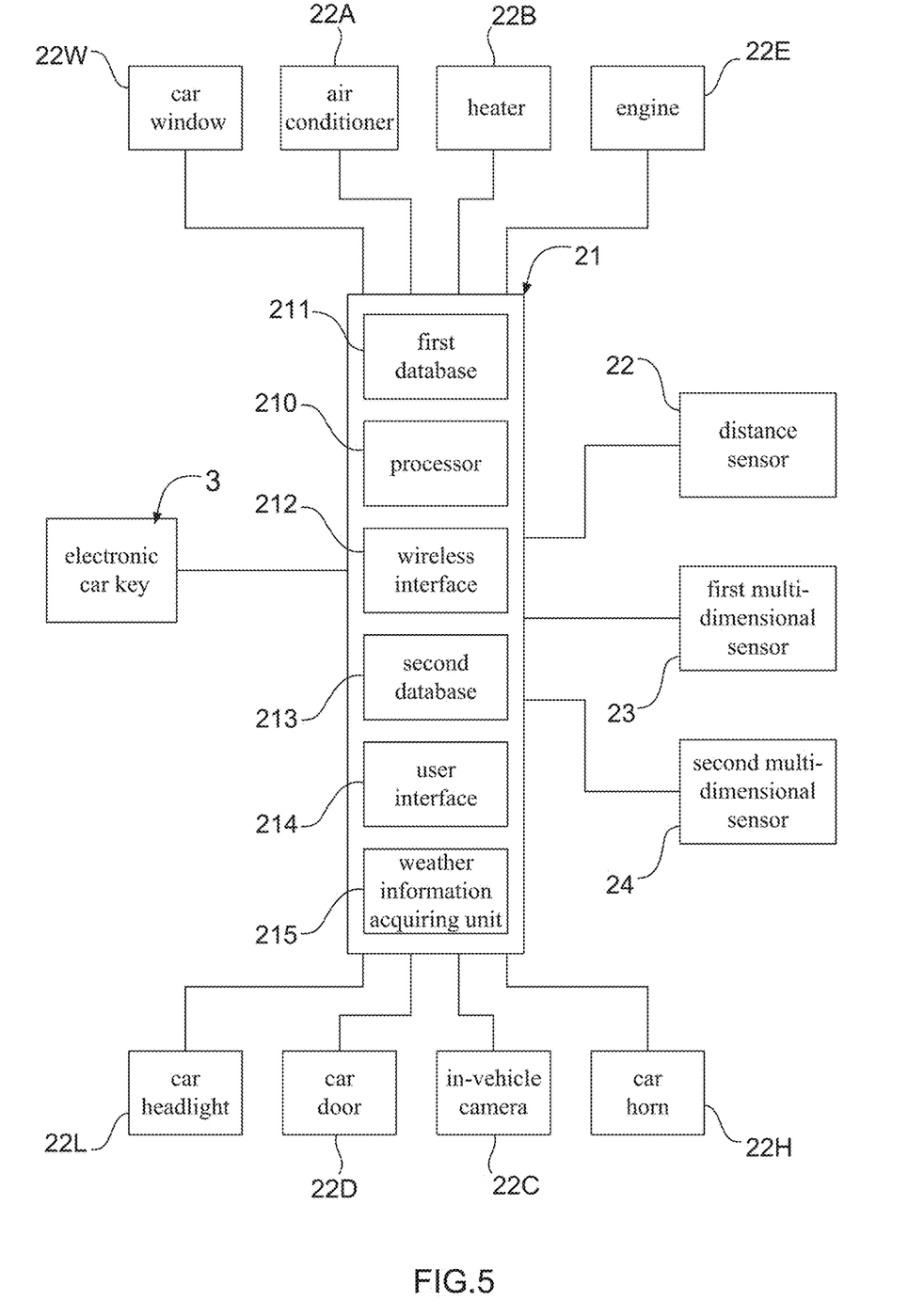
FIG. 5 shows a block diagram of a central console of the automobile.

FIG. 5 shows a block diagram of the central console of the automobile, and FIG. 6 shows a flowchart diagram of a method for achieving interactions between a user and an automobile according to the present invention. As FIG. 5 and FIG. 6 show, the method is conducted by the processor 210, and firstly proceeds to step S1 to arrange a first database 211 and a second database 213 in the memory of the central console 21, and then to store a plurality of reference object actions in the first database 211, and to store a plurality of automobile actions that are respectively corresponding to the plurality of reference object actions in the second database 213.

As explained in more detail below, the distance sensor 22 can be an infrared (IR) radar, a near-IR radar, a ultrasonic radar, a microwave radar, or a millimeter-wave radar. For example, the distance sensor 22 is one ultrasonic radar that is adopted for sensing a distance between the automobile 2 and an object 4 that is approaching the automobile 2. On the other hand, the first multi-dimensional sensor 23 is a microwave radar or a millimeter-wave radar, and is adopted for collecting a first multi-dimensional data from the object 4. The first multi-dimensional data includes at least one parameter of object velocity, object direction angle, and object distance. Moreover, the second multi-dimensional sensor 24 is a light detection and ranging (LiDAR) sensor or an in-vehicle camera 22C, and is adopted for collecting a second multi-dimensional data from the object 4. The second multi-dimensional data includes at least one parameter of object shape, the object distance, object azimuth angle, object elevation angle, and object velocity.

Please continuously refer to FIGS. 1-4, FIG. 5 and FIG. 6. After the step S2 is completed, the method next proceeds to step S2, so as to control the plurality of distance sensors 22, by the processor 210, to detect at least one object 4. Subsequently, in step S3, in case of the plurality of distance sensors 22 detecting that there is at least one object 4 approaching the automobile 2 gradually, the processor 210 controls the plurality of distance sensors 22 to detect a distance between the object 4 and the automobile 2, controls the plurality of first multi-dimensional sensors 23 to collect a first multi-dimensional data from the object 4, and controls the plurality of second multi-dimensional sensors 24 to collect a second multi-dimensional data from the object 4.

Figure 7A:
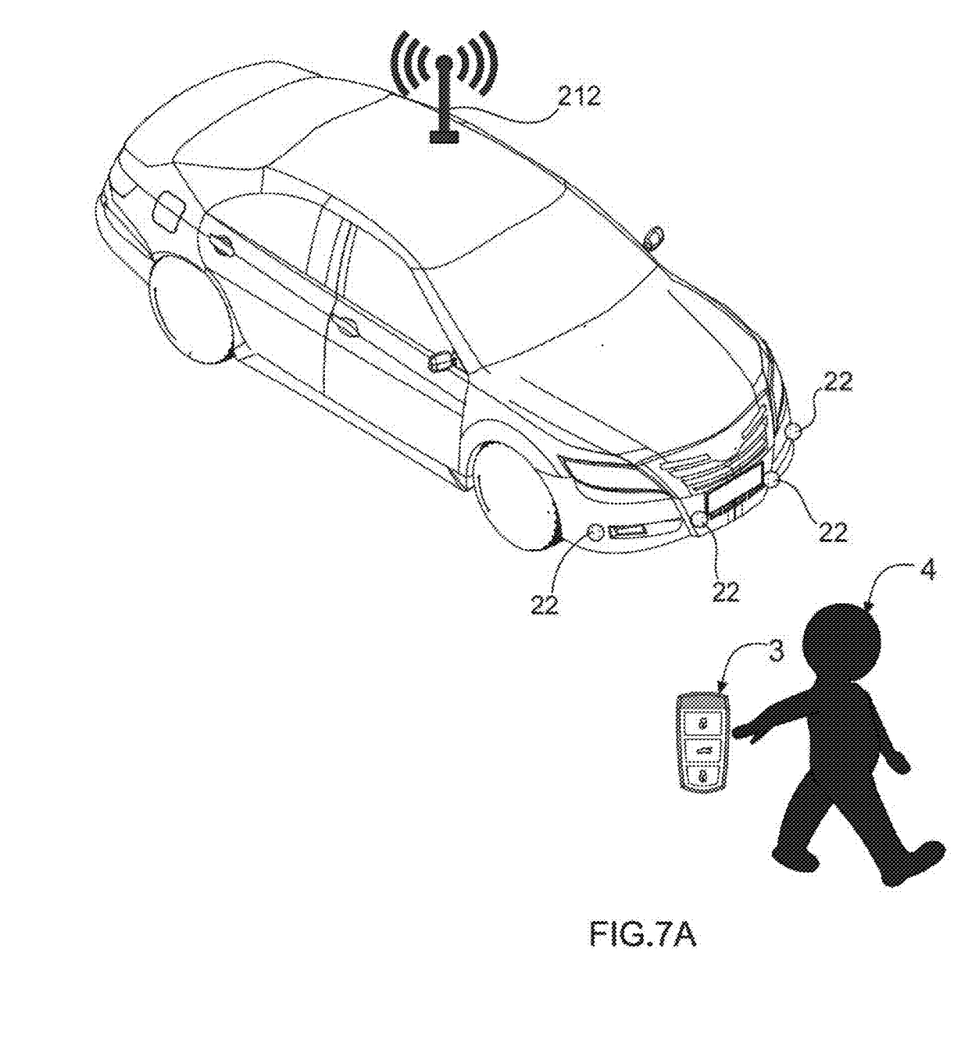
FIG. 7A shows a first stereo diagram of the automobile.

For example, as FIG. 7A shows, a front ultrasonic radar (i.e., the distance sensor 22) of the automobile 2 immediately detect that one object 4 is approaching the automobile 2 in case of a user (i.e., object 4) walks closer to the right front of the automobile 2. In the meantime, the distance sensor 22 is controlled (by the processor 210) to detect an object distance (i.e., the distance between the user and the automobile 2), the first multi-dimensional sensors 23 are controlled to collect a first multi-dimensional data including object velocity, object direction angle and/or object distance from the object 4, and the second multi-dimensional sensors 24 are controlled to collect a second multi-dimensional data including object shape, object distance, object azimuth angle, object elevation angle, and/or object velocity from the object 4.

Figure 7B:
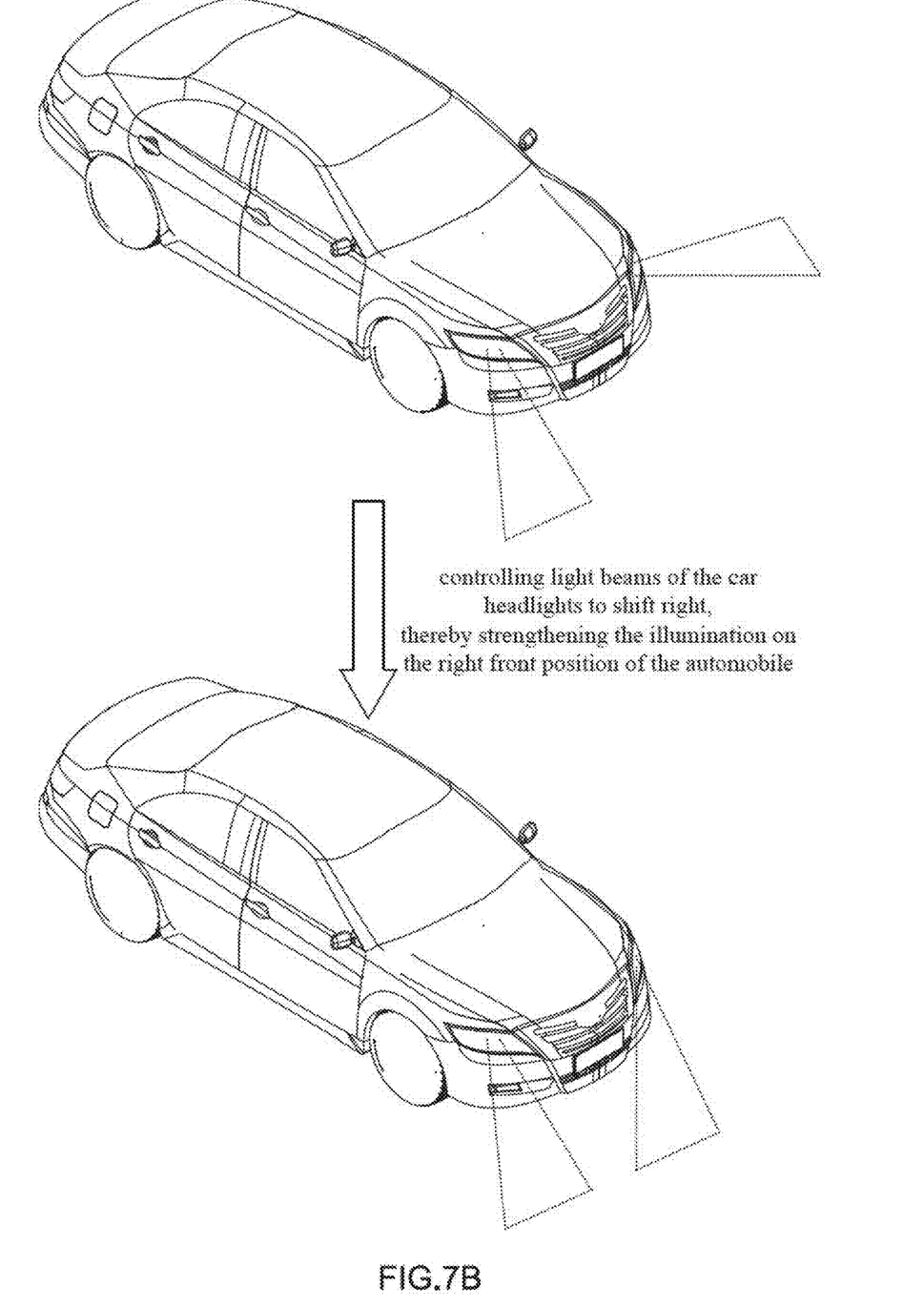
FIG. 7B shows a second stereo diagram of the automobile.

Subsequently, the method proceeds to step S4. In step S4, the processor 210 determines an object action of the object 4 according to a distance data received from the plurality of distance sensors 22, the first multi-dimensional data received from the plurality of first multi-dimensional sensors 23, and the second multi-dimensional data received from the plurality of second multi-dimensional sensors 24. Consequently, in step S5, the processor 210 controls the automobile 2 to conduct a specific automobile action, wherein the specific automobile action is chosen by the processor 210 from the plurality of automobile actions stored in the second database 213, such as unlocking a door lock 22D, opening a car door 22D, adjusting an illumination of at least one car headlight 22L, starting automobile engine 22E, starting air conditioner 22A, controlling an in-vehicle camera 22C to do a video recording work, and honking a car horn 22H. For example, as FIG. 7A and FIG. 7B show, in case of an object action determined by the processor 210 exhibits that the object 4 (i.e., user) who initially stands at the right front of the automobile 2 is gradually far from the automobile 2, the processor 210 controls light beams of the car headlights 22L to shift right, thereby strengthening the illumination on the right front position of the automobile 2.

Particularly, the central console 21 is configured to further include a user interface 214, such that is allowed to optionally enable a function of the object action detection of the automobile 2 by operating the user interface 214. In addition, by operating the user interface 214, the user can further optionally enable a keyless entry function conducted by using the electronic car key 3 to pass a keyless entry authorization check executed by the processor 210, thereby locking or unlocking a door lock of a car door 22D of the automobile 2. For example, as FIG. 5, FIG. 7A and FIG. 7B show, after the user (i.e., object 4) takes the electronic car key 3 and appears at the right front position of the automobile 2, the processor 210 communicates with the electronic car key 3 through a wireless interface 212, and then conducts a keyless entry authorization check to the electronic car key 3. It is worth mentioning that, during an execution of the keyless entry authorization check, the processor 210 simultaneously calculates a position of the electronic car key 3 according to a received signal strength indicator (RSSI). In such case, in case of the processor 210 determining that an object action of the user exhibits that the object 4 (i.e., user) is gradually far from the automobile 2, the processor 210 controls light beams of the car headlights 22L to shift right, thereby strengthening the illumination on the right front position of the automobile 2. On the contrary, after the electronic car key 3 passes the keyless entry authorization check, in case of the processor 210 determining that an object action of the user exhibits that the object 4 (i.e., user) is gradually approaching the automobile 2, the processor 210 controls the car headlights 22L to emit flashlights, and simultaneously honks the car horn 22H.

Figure 8:
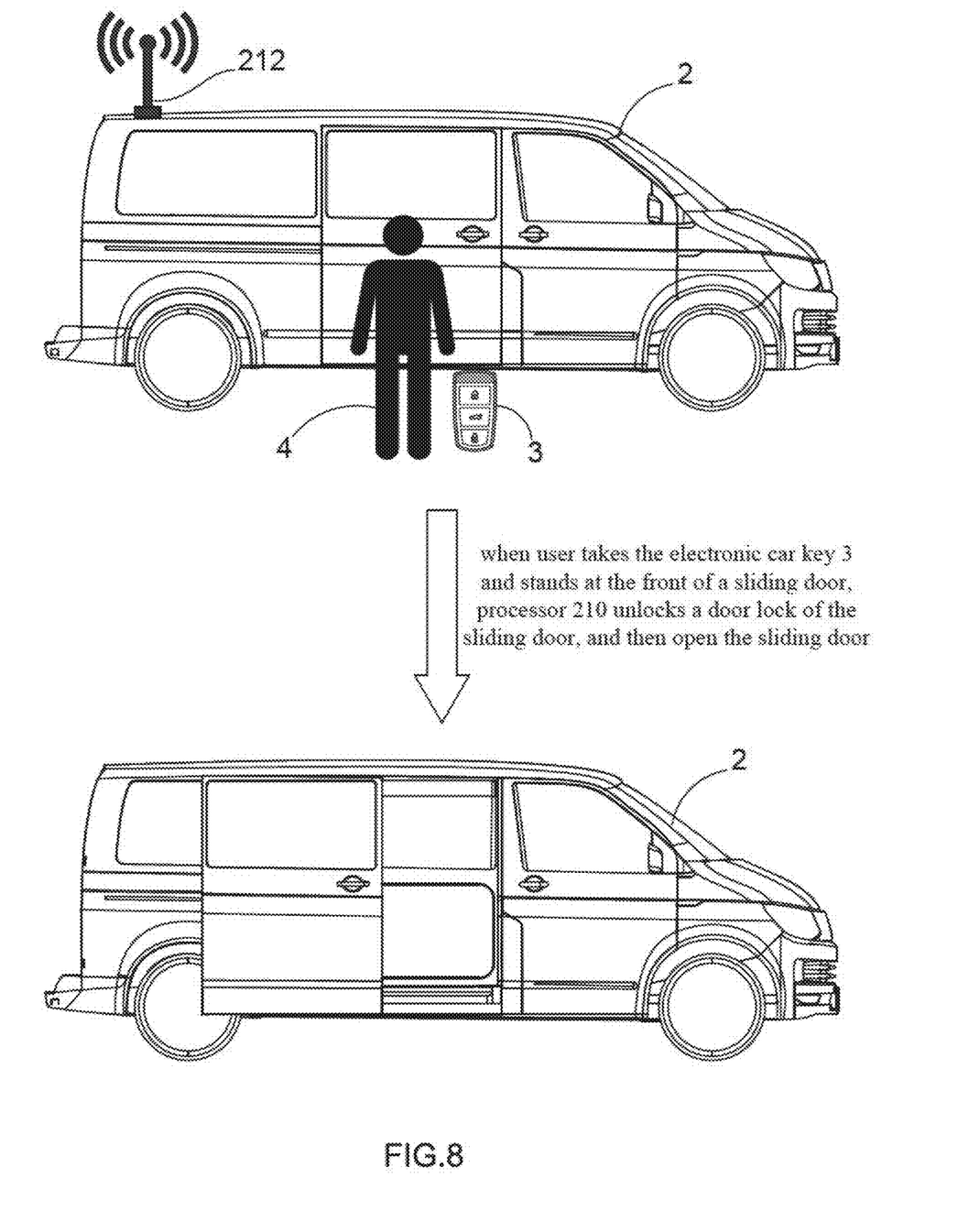
FIG. 8 shows a second side-view diagram of the automobile.

It should be understood that, the user interface 214 allows the user to set the reference object actions that are stored in the first database 211. For example, the reference object actions may comprise: gradually approaching the automobile 2, gradually far from the automobile 2, moving toward the automobile 2 and then stopping at a position, firstly approaching the automobile 2 by a first distance and then far from the automobile 2 by a second distance. After completing the settings of the reference object actions, the user is able to let each of the reference object actions be to correspond with one specific automobile action that is selected from the plurality of automobile actions stored in the second database 213. Of course, the user interface 214 also allows the user to set the automobile actions. For example, the automobile actions may comprise: controlling car window 22W to goes up or down, starting air conditioner 22A, starting heater 22B, starting automobile's engine 22E, adjusting the illumination of the car headlights 22L, unlocking a door lock, opening a car door 22D, controlling an in-vehicle camera 22C to do a video recording work, and honking a car horn 22H. For example, as FIG. 8 shows, after the user (i.e., the object 4) takes the electronic car key 3 and then stands at the front of a sliding door of the automobile 2, the processor 210 unlocks a door lock of the sliding door and then open the sliding door in case of the electronic car key 3 passing the keyless entry authorization check. According to the present invention, during the automobile 2 being controlled by the processor 210 to conduct one specific automobile action, the processor 210 continuously controls the plurality of distance sensors 22 to collect the distance data, controls the plurality of first multi-dimensional sensors 23 to collect the first multi-dimensional data from the object 4, and controls the plurality of second multi-dimensional sensors 24 to collect the second multi-dimensional data from the object 4. By such arrangements, object detection is continuously executed by the sensors (22, 23 and 24) during the automobile 2 conducting one specific automobile action.

Moreover, the user interface 214 further allows the user to optionally enable a function of anti-theft protection. When the function of anti-theft protection is enabled, in case of the object action being determined to fail to correspond with any one of the reference object actions as well as the processor 210 not communicating with the corresponding electronic car key 3, the in-vehicle camera 22C of the automobile 2 is controlled by the processor 210 to start a video recording work. In other words, if there is one person who not takes corresponding electronic car key 3 standing near the automobile 2 as well as the person performers a specific object action that is fail to correspond with any one of the plurality of reference object actions that are set by the owner of the automobile 2, the processor 210 would control the in-vehicle camera 22C to conduct a video recording work for achieving anti-theft protection.

It needs to further explain that, ultrasonic radar (i.e., the distance sensor 22) can be controlled by the processor 210, so as to well complete the detection of object distance without being influenced by weather condition. However, in spite of that fact that the optical sensors (i.e., LiDAR and camera) can be controlled by the processor 210 for collecting the multi-dimensional data from the object 4, their sensing accuracy is dependent on weather condition. For above reasons, the central console 21 is installed with a weather information acquiring unit 215 therein. To carrying out the installation of the weather information acquiring unit 215 in the central console 21, the processor 210 is embedded with a program therein, such that the processor 210 executes the program (i.e., the weather information acquiring unit 215) for acquiring an immediate weather information. After that, the processor 210 produces at least one weight parameter based on the immediate weather information, thereby performing an adaptive weight modulating operation of the distance data, the first multi-dimensional data and/or the second multi-dimensional data by using the at least one weight parameter and an adaptive weight modulating algorithm.

Therefore, through above descriptions, the method for achieving interactions between user and automobile according to the present invention have been introduced completely and clearly. The above description is made on embodiments of the present invention. However, the embodiments are not intended to limit scope of the present invention, and all equivalent implementations or alterations within the spirit of the present invention still fall within the scope of the present invention.

What is claimed is:

1. A method for achieving interactions between a user and an automobile, being conducted by a processor that is installed in a central console of the automobile; wherein the central console has a memory, the automobile being equipped with a plurality of distance sensors, a plurality of first multi-dimensional sensors, and a plurality of second multi-dimensional sensors, and the automobile having a keyless entry system comprising the processor and an electronic car key; the method comprising the steps of:
   (1) utilizing the processor to arrange a first database and a second database in the memory of the central console, and then to store a plurality of reference object actions in the first database, and to store a plurality of automobile actions that are respectively corresponding to the plurality of reference object actions in the second database;
   (2) controlling the plurality of distance sensors, by the processor, to detect at least one object;
   (3) in case of the plurality of distance sensors detecting that there is at least one object approaching the automobile gradually, utilizing the processor to control the plurality of distance sensors to detect a distance between the object and the automobile, to control the plurality of first multi-dimensional sensors to collect a first multi-dimensional data from the object, and to control the plurality of second multi-dimensional sensors to collect a second multi-dimensional data from the object;
   (4) determining an object action of the object by the processor according to a distance data received from the plurality of distance sensors, the first multi-dimensional data received from the plurality of first multi-dimensional sensors, and the second multi-dimensional data received from the plurality of second multi-dimensional sensors; and
   (5) controlling the automobile to conduct a specific automobile action by the processor, wherein the specific automobile action is chosen by the processor from the plurality of automobile actions stored in the second database.

2. The method of claim 1, wherein the central console has a user interface, and the user interface allowing the user to optionally enable a function of the object action detection of the automobile, and/or to optionally enable a keyless entry function conducted by using the electronic car key to pass a keyless entry authorization check executed by the processor so as to lock or unlock a door lock of the automobile.

3. The method of claim 2, wherein in case of the keyless entry function being enabled by operating the user interface, the method further comprises an additional step connected between the step (4) and the step (5) of:
   (4a) the processor communicating with the electronic car key that is near to the automobile through a wireless interface, thereby conducting a keyless entry authorization check to the electronic car key.

4. The method of claim 3, wherein during an execution of the keyless entry authorization check, the processor simultaneously calculating a position of the electronic car key according to a received signal strength indicator (RSSI).

5. The method of claim 3, wherein in case of the object action being determined to fail to correspond with any one of the plurality of reference object actions as well as the processor not communicating with the electronic car key, an in-vehicle camera of the automobile being controlled by the processor to start a video recording work.

6. The method of claim 3, wherein the distance sensor is selected from a group consisting of infrared (IR) radar, near-IR radar, ultrasonic radar, microwave radar and millimeter-wave radar.

7. The method of claim 3, wherein the first multi-dimensional sensor is a microwave radar or a millimeter-wave radar, and the second multi-dimensional sensor being a light detection and ranging (LiDAR) sensor.

8. The method of claim 3, wherein the second multi-dimensional sensor is selected from a group consisting of light detection and ranging (LiDAR) sensor and in-vehicle camera.

9. The method of claim 3, wherein the first multi-dimensional data includes at least one parameter selected from a group consisting of object velocity, object direction angle, and object distance.

10. The method of claim 3, wherein the second multi-dimensional data includes at least one parameter selected from a group consisting of object shape, object distance, object azimuth angle, object elevation angle, and object velocity.

11. The method of claim 1, wherein during the automobile conducting the specific automobile action, the processor continuously controlling the plurality of distance sensors to collect the distance data, controlling the plurality of first multi-dimensional sensors to collect the first multi-dimensional data from the object, and controlling the plurality of second multi-dimensional sensors to collect the second multi-dimensional data from the object.

12. The method of claim 1, wherein the processor comprises a program including instructions for acquiring an immediate weather information, such that the processor produces at least one weight parameter based on the immediate weather information, so as to utilize the at least one weight parameter to adjust the distance data, the first multi-dimensional data and/or the second multi-dimensional data.

13. The method of claim 1, wherein the plurality of automobile actions comprise unlocking a door lock, opening a car door, adjusting an illumination of at least one car headlight, starting automobile engine, starting air conditioner, controlling an in-vehicle camera, and honking a car horn.

* * * * *